United States Patent
Yuan et al.

(10) Patent No.: US 10,650,854 B1
(45) Date of Patent: May 12, 2020

(54) HEAT-ASSISTED MAGNETIC RECORDING (HAMR) MEDIUM WITH IMPROVED CORROSION RESISTANCE

(71) Applicant: Western Digital Technologies, Inc., San Jose, CA (US)

(72) Inventors: Hua Yuan, San Ramon, CA (US); Paul Christopher Dorsey, Los Altos, CA (US); Fenghua Zong, San Jose, CA (US); Shahid Ali Pirzada, Fremont, CA (US); Allen Joseph Bourez, San Jose, CA (US); Zhaoqiang Bai, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 332 days.

(21) Appl. No.: 15/489,167

(22) Filed: Apr. 17, 2017

(51) Int. Cl.
*G11B 5/66* (2006.01)
*G11B 5/73* (2006.01)
*G11B 5/65* (2006.01)
*G11B 5/012* (2006.01)
*G11B 5/00* (2006.01)

(52) U.S. Cl.
CPC ............ *G11B 5/7325* (2013.01); *G11B 5/012* (2013.01); *G11B 5/653* (2013.01); *G11B 5/656* (2013.01); *G11B 2005/0021* (2013.01)

(58) Field of Classification Search
None
See application file for complete search history.

(56) References Cited

U.S. PATENT DOCUMENTS

| 8,509,039 B1 | 8/2013 | Huang et al. | |
|---|---|---|---|
| 8,941,950 B2 | 1/2015 | Yuan et al. | |
| 9,406,329 B1 | 8/2016 | Ho et al. | |
| 2008/0204917 A1* | 8/2008 | Nakamura | B82Y 10/00 360/59 |
| 2015/0017480 A1* | 1/2015 | Hirotsune | G11B 5/314 428/800 |
| 2016/0225393 A1* | 8/2016 | Varaprasad | G11B 5/64 |

* cited by examiner

*Primary Examiner* — Holly C Rickman
(74) *Attorney, Agent, or Firm* — Thomas R. Berthold

(57) ABSTRACT

A heat-assisted magnetic recording (HAMR) medium has a heat-sink layer, a chemically-ordered FePt (or CoPt) alloy magnetic layer and a MgNiO intermediate layer between the heat-sink layer and the magnetic layer. The intermediate layer is a solid substitution crystalline alloy of the form $(Mg_{(100-y)}Ni_y)O$, where y is less than 10 and greater than or equal to 0.5. The magnetic layer may be formed directly on the MgNiO intermediate layer, in which case the MgNiO intermediate layer functions as both a seed layer and a thermal barrier layer. The HAMR medium may also include an optional layer of crystalline "pure" MgO directly below or directly above the MgNiO intermediate layer. If the MgO layer is located directly above the MgNiO intermediate layer then the MgNiO intermediate layer functions primarily as a thermal barrier layer. The HAMR medium with the MgNiO intermediate layer provides a substantial improvement in corrosion resistance.

15 Claims, 4 Drawing Sheets

HEAT-ASSISTED MAGNETIC RECORDING (HAMR) MEDIUM WITH IMPROVED CORROSION RESISTANCE

BACKGROUND

Field of the Invention

This invention relates generally to a perpendicular magnetic recording medium for use as a heat-assisted magnetic recording (HAMR) medium, and more particularly to a HAMR medium with improved corrosion resistance.

Description of the Related Art

In conventional continuous granular magnetic recording media, the magnetic recording layer is a continuous layer of granular magnetic material over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the air-bearing surface (ABS) of the air-bearing slider that also supports the read/write head and rides or "flies" above the disk surface.

One type of proposed high-$K_u$ HAMR media with perpendicular magnetic anisotropy is an alloy of FePt (or CoPt) alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt alloy requires deposition at high temperature or subsequent high-temperature annealing to achieve the desired chemical ordering to the $L1_0$ phase.

The FePt alloy magnetic layer also typically includes a segregant like C, $SiO_2$, $TiO_2$, $TaO_x$, $ZrO_2$, SiC, SiN, TiC, TiN, B, BC or BN that forms between the FePt grains and reduces the grain size. To obtain the required microstructure and magnetic properties, the FePt needs to be deposited with the substrate maintained at high temperatures (e.g., about 500 to 700° C.). In HAMR media, a MgO underlayer is used as a seed layer to induce the desirable (001) texture to the FePt magnetic grains and influence their geometrical microstructure and to also act as a thermal barrier layer.

SUMMARY

However, the use of MgO as an underlayer can cause corrosion of the medium. MgO is highly sensitive and reactive with moisture. Surface defects can occur with penetration of moisture to the MgO layer and/or migration of Mg to the medium surface. Surface defects can cause severe head-disk interface issues.

Embodiments of the invention relate to a HAMR medium with a heat-sink layer, a chemically-ordered FePt (or CoPt) alloy magnetic layer and a MgNiO intermediate layer between the heat-sink layer and the magnetic layer. The intermediate layer is a solid substitution crystalline alloy of the form $(Mg_{(100-y)}Ni_y)O$, where y is less than 10 and greater than or equal to 0.5. In an embodiment where the magnetic layer is formed directly on the MgNiO intermediate layer, then the MgNiO intermediate layer functions as both a seed layer and a thermal barrier layer. The HAMR medium may also include an optional layer of crystalline "pure" MgO directly below or directly above the MgNiO intermediate layer. In an embodiment where the MgO layer is located directly above the MgNiO intermediate layer then the MgNiO intermediate layer functions primarily as a thermal barrier layer. In an embodiment where the MgO layer is located directly below the MgNiO layer and the magnetic layer is formed directly on the MgNiO intermediate layer, then the MgNiO intermediate layer functions as both a seed layer and a thermal barrier layer.

The HAMR medium with the MgNiO intermediate layer has substantially better corrosion resistance than the prior art HAMR medium with just the MgO underlayer.

For a fuller understanding of the nature and advantages of the present invention, reference should be made to the following detailed description taken together with the accompanying figures.

DETAILED DESCRIPTION

Figure 1:
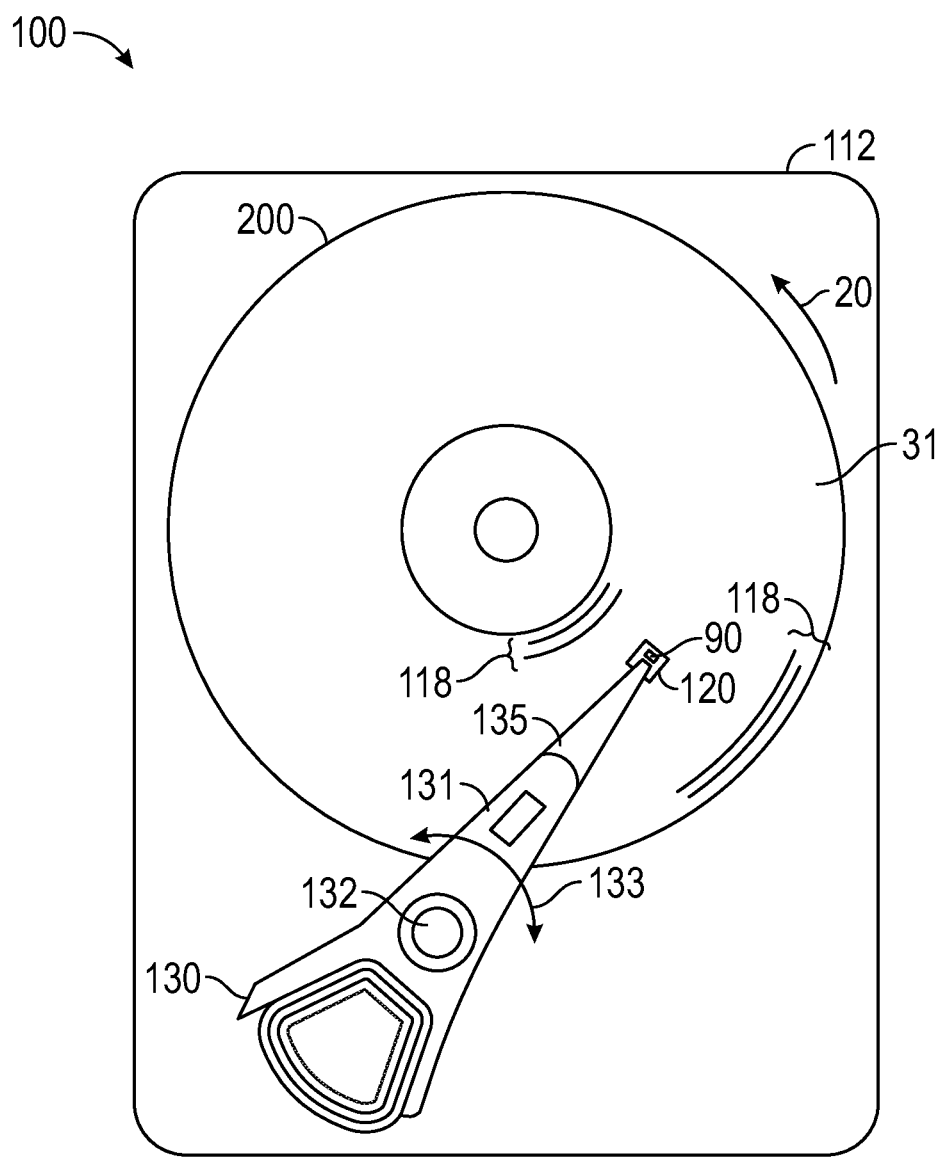
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG.

1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
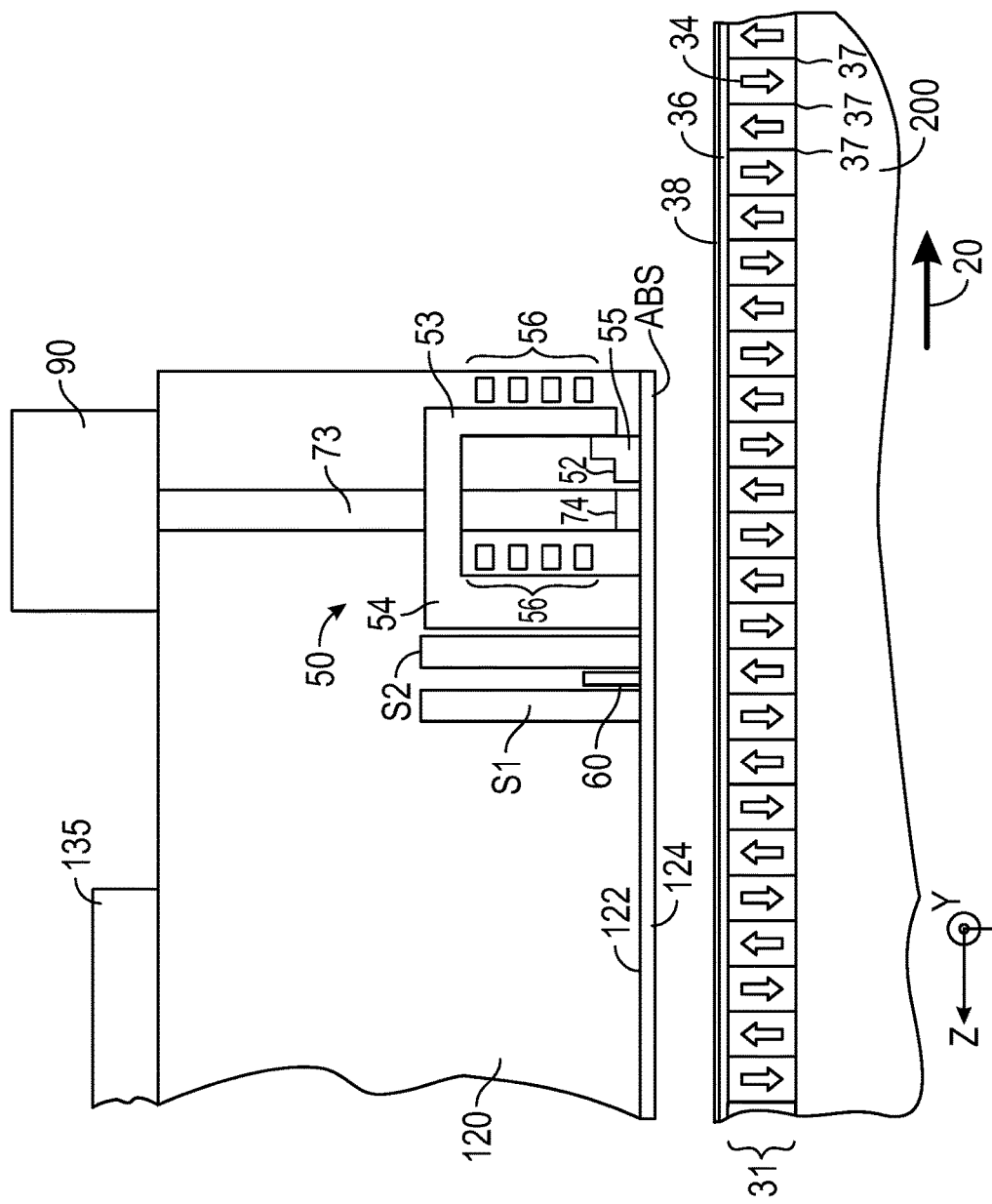
FIG. 2 depicts a sectional view, not drawn to scale because of the difficulty in showing the very small features, of an air-bearing slider for use in HAMR disk drive and a portion of a HAMR disk according to the prior.

In the following drawings, the X direction denotes a direction perpendicular to the air-bearing surface (ABS) of the slider, the Y direction denotes a track width or cross-track direction, and the Z direction denotes an along-the-track direction. FIG. 2A is a schematic cross-sectional view illustrating a configuration example of a HAMR head according to the prior art, which is also capable of functioning as the HAMR head in embodiments of this invention. In FIG. 2A, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The air-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the ABS of the slider 120. An optional adhesion film or undercoat (not shown), such as a 1 to 5 Å silicon nitride ($SiN_x$) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider ABS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$, as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

Figure 3:
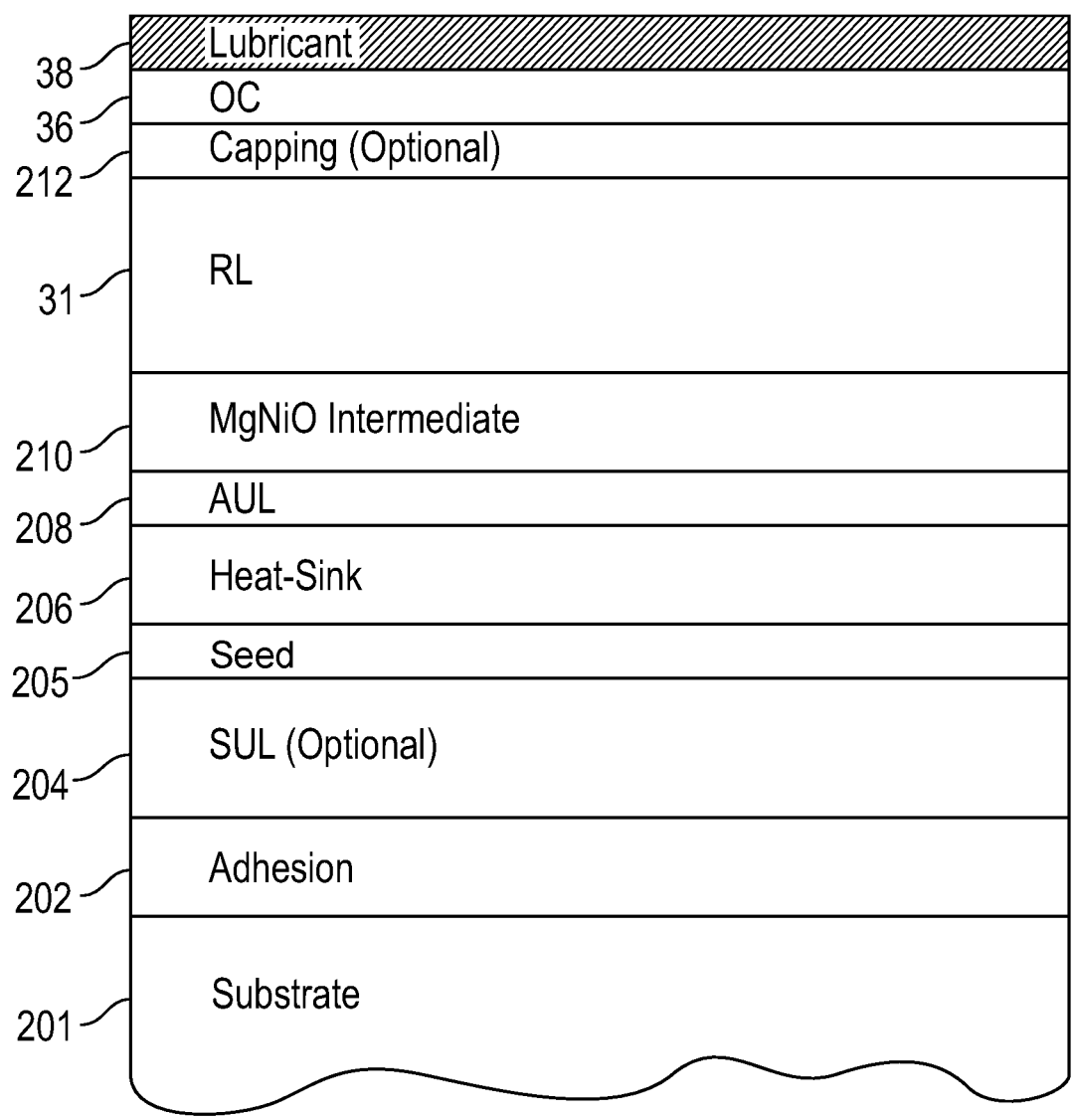
FIG. 3 is a sectional view showing a HAMR disk according to a first embodiment of the invention.

FIG. 3 is a sectional view showing HAMR disk 200 with a continuous recording layer (RL) 31 according to a first embodiment of the invention. The recording layer 31 may be comprised of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 202, typically about 10-200 nm of an amorphous adhesion layer material like a CrTa or NiTa alloy, is deposited on substrate 200.

An optional soft underlayer (SUL) 204 of magnetically permeable material that serves as a flux return path for the magnetic flux from the write head may be formed on the adhesion layer 202. The SUL 204 may be formed of magnetically permeable materials that are also compatible with the high-temperature deposition process for FePt, such as certain alloys of CoFeZr and CoZr. The SUL 204 may also be a laminated or multilayered SUL formed of multiple soft magnetic films separated by nonmagnetic films, such as electrically conductive films of Al or CoCr. The SUL 204 may also be a laminated or multilayered SUL formed of multiple soft magnetic films separated by interlayer films that mediate an antiferromagnetic coupling, such as Ru, Ir, or Cr or alloys thereof. The SUL 204 may have a thickness in the range of about 5 to 100 nm. A seed layer 205, for example a layer of RuAl or NiAl, is deposited on SUL 204, or on adhesion layer 202 if no SUL is used. A heat-sink layer 206 is then deposited on seed layer 205. The heat-sink layer 206 facilitates the transfer of heat away from the RL to prevent spreading of heat to regions of the RL adjacent to where data is desired to be written, thus preventing overwriting of data in adjacent data tracks. The heat sink layer 206 may be a single layer of Ag, Al, Cu, Cr, Au, Ru, W and Mo, or a multilayer of two or more of these materials, with a typical thickness between about 5-200 nm.

An amorphous underlayer (AUL) 208 is deposited on the heat-sink layer 206. The AUL 208 may be alloys like CoZrWMo, CoFeCrTa and CoCrTaZr. In an embodiment of this invention a MgNiO intermediate layer 210 acts as both a seed layer for the RL 31 and a thermal barrier layer. In FIG. 3 the MgNiO intermediate layer 210 is deposited on the AUL 208. The MgNiO intermediate layer 210 is a solid substitution crystalline alloy of the form $(Mg_{(100-y)}Ni_y)O$, where y is less than 10 and greater than or equal to 0.5, with a thickness in the range of about 2-10 nm. In one variation of the first embodiment the heat-sink layer 206 is Ru, and the MgNiO intermediate layer 210 is formed directly on the AUL 208. In another variation of the first embodiment the heat-sink layer 206 is Cr and the MgNiO intermediate layer 210 is formed directly on the Cr heat-sink layer 206 without the need for AUL 208.

In the prior art a pure MgO layer acts as the seed layer and thermal barrier layer. The use of MgO can lead to corrosion of the disk. Disk corrosion results in surface defects that can cause severe head-disk interface issues, primarily due to the sensitivity/reactivity of MgO to moisture in the air. Voids and micropores in the RL and OC can allow moisture to reach the MgO layer and/or Mg to migratte to the disk surface.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While the method will be described for fabricating media with a FePt RL, the method is also fully applicable to media with a CoPt (or a pseudo-binary CoPt—X alloy based on the CoPt $L1_0$ phase) RL.

FePt $L1_0$ phase based thin films exhibit strong perpendicular anisotropy, which potentially leads to small thermally stable grains for ultrahigh density magnetic recording. To fabricate small grain FePt $L1_0$ media some form of segregant to separate grains can be used as an integral part of the magnetic recording layer. Thus in the HAMR disk 200, the RL 31 also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. While FIG. 3 depicts the RL 31 as a single magnetic layer, the recording layer may be a multilayer, for example multiple stacked FePt sublayers, each with a different segregant, as described in U.S. Pat. No. 9,406,329 B1 which is assigned to the same assignee as this application.

The FePt RL is sputter deposited, typically to a thickness of between about 4 to 15 nm, while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets.

An optional capping layer 212, such as a thin film of Co, may be formed on the RL 31. A protective overcoat (OC) 36 is deposited on the RL 31 (or on the optional capping layer 212), typically to a thickness between about 1-5 nm. OC 36 is preferably a layer of amorphous diamond-like carbon (DLC). The DLC may also be hydrogenated and/or nitrogenated, as is well-known in the art. On the completed disk, a liquid lubricant 38, like a perfluorpolyether (PFPE), is coated on OC 36.

A highly accelerated corrosion test (HACT) was performed for the disk depicted in FIG. 3 (a Ru heat-sink layer and a RuAl AUL) with about 10% Ni in the total amount of Mg+Ni and for a comparable disk with just pure MgO (100% Mg). The HACT is performed at 50° C. and 90% relative humidity (RH) for 24 hours. The medium surface is scanned optically before and after the HACT test to detect and count surface defects (counts/$cm^2$). The disk with the MgO layer exhibited a count of 450 while the disk with the MgNiO layer of the same thickness exhibited a count of only 35. In the variation of the disk depicted in FIG. 3 with the MgNiO intermediate layer formed directly on a Cr heat-sink layer, the disk with the MgO layer exhibited a count of 450 while the disk with the MgNiO layer of the same thickness exhibited a count of only 129. The substantial improvement in corrosion resistance may be due to the finer grain structure induced in the FePt RL, which minimizes voids and micropores.

These corrosion results indicate that even smaller amounts of Ni will also result in substantial improvements in corrosion resistance. An amount of Ni of only 0.5% of the total of Mg+Ni may result in improved corrosion resistance since data has shown improved corrosion resistance for very small amounts of other materials, for example 0.5% of Zr in Mg+Zr, which also likely causes a finer grain structure in the FePt RL.

The HAMR medium with the intermediate layer formed of a solid substitution crystalline alloy of the form $(Mg_{(100-y)}Ni_y)O$, where y is less than 10 and greater than or equal to 0.5, has no significant difference in magnetic properties as compared to a prior art medium with a pure MgO layer as the seed and thermal barrier layer. The amount of Ni should be kept below 10% of the total of Mg+Ni because it has been discovered that a greater amount adversely affects the magnetic properties of the medium. As the amount of Ni increases to 50%, the coercivity (Hc) of the medium decreases by 30%.

U.S. Pat. No. 8,509,039 B1, which is assigned to the same assignee as this application, describes a HAMR medium with a $(Mg_{(100-y)}Ni_y)O$ intermediate layer, where y is equal to or greater than 10 and less than or equal to 90. The HAMR medium with this amount of Ni in the intermediate layer has significantly lower thermal conductivity than a HAMR medium with a pure MgO seed and thermal barrier layer, and thus enables the magnetic layer to be heated to the desired temperature with lower laser power. However, there is no teaching or suggestion in the '039 patent that this high amount of Ni adversely affects the magnetic properties of the medium.

Figure 4:
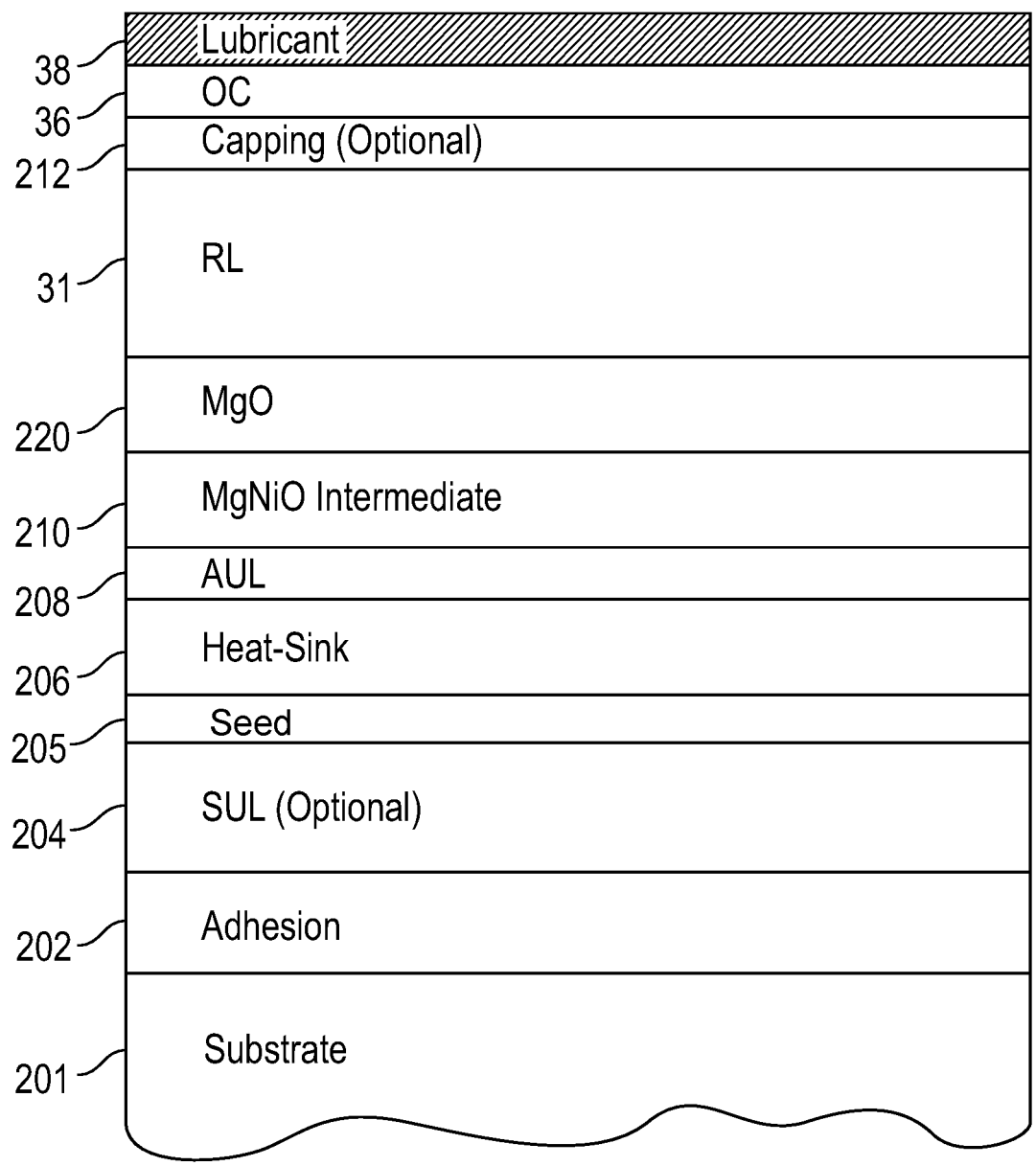
FIG. 4 is a sectional view showing a HAMR disk according to a second embodiment of the invention.

FIG. 4 is a sectional view showing HAMR disk 200 with a continuous granular recording layer (RL) 31 according to a second embodiment of the invention. This embodiment is substantially similar to the embodiment described with respect to FIG. 3, except that a pure MgO layer 220, in addition to the MgNiO layer, is located between the heat-sink layer 206 and the RL 31. In the embodiment depicted in FIG. 4, the MgO layer 220 is located directly above the MgNiO intermediate layer 210 and directly below the RL 31. The MgO layer 220 acts as the seed layer for the RL 31, while the MgNiO intermediate layer 210 functions only as a thermal barrier layer. Alternatively, the MgO layer 220 may be located directly below the MgNiO intermediate layer 210, with the RL 31 being located directly on the MgO intermediate layer 210, in which case the MgO intermediate layer 210 functions as both a seed layer and a thermal barrier layer. In one variation of the second embodiment, the heat-sink layer 206 is Ru, and the MgNiO intermediate layer 210 (or alternatively the MgO layer 220) is formed directly on the AUL 208. In another variation of the second embodiment the heat-sink layer 206 is Cr and the MgNiO intermediate layer 210 (or alternatively the MgO layer 220) is formed directly on the Cr heat-sink layer 206 without the need for AUL 208.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording medium comprising:
    a substrate;
    a heat-sink layer on the substrate;
    an amorphous underlayer directly on the heat-sink layer, the underlayer selected from the group consisting of a CoZrWMo alloy, a CoFeCrTa alloy and a CoCrTaZr alloy;
    an intermediate layer directly on the underlayer, the intermediate layer comprising a layer of a solid substitution crystalline alloy of the form $(Mg_{(100-y)}Ni_y)O$, where y is less than 10 and greater than or equal to 0.5, the intermediate layer having a thickness greater than or equal to 2 nm and less than or equal to 10 nm;
    a layer consisting of MgO directly on the intermediate layer; and
    a magnetic recording layer comprising a chemically-ordered alloy selected from a FePt alloy and a CoPt alloy directly on the MgO layer.

2. The medium of claim 1 further comprising an adhesion layer on and in contact with the substrate and a seed layer on the adhesion layer, wherein the heat-sink layer is on and in contact with the seed layer.

3. The medium of claim 1 wherein the magnetic recording layer comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

4. The medium of claim 1 wherein the magnetic recording layer comprises a substantially chemically-ordered pseudo-binary FePtX alloy in the $L1_0$ phase, where X is one or more of Ni, Au, Cu, Pd, Mn and Ag.

5. The medium of claim 1 wherein the magnetic recording layer consists of Fe, Pt and C.

6. The medium of claim 1 wherein the heat-sink layer comprises a single layer or multilayer selected from Ag, Al, Cu, Cr, Au, Ru, W and Mo.

7. A heat assisted magnetic recording (HAMR) disk drive comprising:
    the medium according to claim 1 wherein said medium is a rotatable HAMR disk; and
    a carrier maintained near the magnetic layer of said medium and supporting a near-field transducer.

8. A heat-assisted magnetic recording disk comprising:
    a substrate;
    a heat-sink layer on the substrate, the heat-sink layer comprising a single layer or multilayer selected from Ag, Al, Cu, Cr, Au, Ru, W and Mo;
    an amorphous underlayer directly on the heat-sink layer, the underlayer selected from the group consisting of a CoZrWMo alloy, a CoFeCrTa alloy and a CoCrTaZr alloy;
    an intermediate layer directly on the underlayer, the intermediate layer comprising a layer of a solid substitution crystalline alloy of the form $(Mg_{(100-y)}Ni_y)O$, where y is less than 10 and greater than or equal to 0.5; and
    a magnetic recording layer comprising a chemically-ordered FePt alloy and a segregant on the intermediate layer.

9. The disk of claim 8 wherein the magnetic recording layer is directly on and in contact with the intermediate layer.

10. The disk of claim 8 further comprising a layer consisting of MgO between the intermediate layer and the magnetic recording layer and wherein the magnetic recording layer is directly on and in contact with the MgO layer.

11. The disk of claim 8 wherein the intermediate layer has a thickness greater than or equal to 2 nm and less than or equal to 10 nm.

12. The disk of claim 8 wherein the segregant is selected from one or more of C, $SiO_2$, $TiO_2$, $TaO_x$, $ZrO_2$, SiC, SiN, TiC, TiN, B, BC and BN.

13. A heat-assisted magnetic recording disk comprising:
    a substrate;
    a heat-sink layer consisting of Cr on the substrate;
    an intermediate layer directly on the heat-sink layer, the intermediate layer comprising a layer of a solid substitution crystalline alloy of the form $(Mg_{(100-y)}Ni_y)O$, where y is less than 10 and greater than or equal to 0.5; and
    a magnetic recording layer comprising a chemically-ordered FePt alloy and a segregant directly on and in contact with the intermediate layer.

14. The disk of claim 13 wherein the intermediate layer has a thickness greater than or equal to 2 nm and less than or equal to 10 nm.

15. The disk of claim 13 wherein the segregant is selected from one or more of C, $SiO_2$, $TiO_2$, $TaO_x$, $ZrO_2$, SiC, SiN, TiC, TiN, B, BC and BN.

* * * * *